United States Patent
Kang et al.

(10) Patent No.: US 12,002,138 B2
(45) Date of Patent: Jun. 4, 2024

(54) SPEECH-DRIVEN ANIMATION METHOD AND APPARATUS BASED ON ARTIFICIAL INTELLIGENCE

(71) Applicant: TENCENT TECHNOLOGY (SHENZHEN) COMPANY LIMITED, Shenzhen (CN)

(72) Inventors: Shiyin Kang, Shenzhen (CN); Deyi Tuo, Shenzhen (CN); Kuongchi Lei, Shenzhen (CN); Tianxiao Fu, Shenzhen (CN); Huirong Huang, Shenzhen (CN); Dan Su, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 259 days.

(21) Appl. No.: 17/497,622

(22) Filed: Oct. 8, 2021

(65) Prior Publication Data
US 2022/0044463 A1 Feb. 10, 2022

Related U.S. Application Data (63) Continuation of application No. PCT/CN2020/105046, filed on Jul. 28, 2020.

(30) Foreign Application Priority Data

Aug. 29, 2019 (CN) .......................... 201910820742.1

(51) Int. Cl.
*G06T 13/20* (2011.01)
*G06N 3/04* (2023.01)
(Continued)

(52) U.S. Cl.
CPC ........... *G06T 13/205* (2013.01); *G06N 3/045* (2023.01); *G06T 13/40* (2013.01); *G10L 15/04* (2013.01); *G10L 15/187* (2013.01); *G10L 15/30* (2013.01)

(58) Field of Classification Search
CPC ......... G06N 3/045; G06T 13/40; G10L 15/04; G10L 15/02; G10L 2015/025; G10L 15/187; G10L 15/30
See application file for complete search history.

(56) References Cited

U.S. PATENT DOCUMENTS

2002/0024519 A1   2/2002  Park
2003/0149569 A1 * 8/2003  Jowitt ..................... G06T 13/00
                                                                  704/E21.02
(Continued)

FOREIGN PATENT DOCUMENTS

CN         101364309 A        2/2009
CN         101923726 A       12/2010
(Continued)

OTHER PUBLICATIONS

The World Intellectual Property Organization (WIPO) International Search Report for PCT/CN2020/105046 dated Nov. 6, 2020 7 Pages (including translation).

(Continued)

*Primary Examiner* — Todd Buttram
(74) *Attorney, Agent, or Firm* — ANOVA LAW GROUP, PLLC (57) ABSTRACT

Embodiments of this application disclose a speech-driven animation method and apparatus based on artificial intelligence (AI). The method includes obtaining a first speech, the first speech comprising a plurality of speech frames; determining linguistics information corresponding to a speech frame in the first speech, the linguistics information being used for identifying a distribution possibility that the speech (Continued)

frame in the first speech pertains to phonemes; determining an expression parameter corresponding to the speech frame in the first speech according to the linguistics information; and enabling, according to the expression parameter, an animation character to make an expression corresponding to the first speech.

19 Claims, 6 Drawing Sheets

(51) Int. Cl.
| | | |
|---|---|---|
| *G06N 3/045* | (2023.01) | |
| *G06T 13/40* | (2011.01) | |
| *G10L 15/04* | (2013.01) | |
| *G10L 15/187* | (2013.01) | |
| *G10L 15/30* | (2013.01) | |

(56) References Cited

U.S. PATENT DOCUMENTS

| | | | |
|---|---|---|---|
| 2018/0137678 A1 | 5/2018 | Kaehler | |
| 2020/0074985 A1* | 3/2020 | Clark | G10L 25/24 |
| 2021/0050004 A1* | 2/2021 | Whiting | G10L 15/005 |
| 2022/0044463 A1* | 2/2022 | Kang | G06T 13/40 |

FOREIGN PATENT DOCUMENTS

| | | | | |
|---|---|---|---|---|
| CN | 106653052 A | | 5/2017 | |
| CN | 108447474 A | | 8/2018 | |
| CN | 109377540 A | | 2/2019 | |
| CN | 109829363 A | | 5/2019 | |
| CN | 110009716 A | | 7/2019 | |
| CN | 110503942 A | | 11/2019 | |
| JP | 2002197488 A | | 7/2002 | |
| JP | 2002298155 A | | 10/2002 | |
| JP | 2006065683 A | | 3/2006 | |
| JP | 2007058846 A | * | 3/2007 | |
| JP | 2007058846 A | | 3/2007 | |
| JP | 2009139677 A | * | 6/2009 | G10L 13/08 |
| JP | 4631078 B2 | * | 2/2011 | |
| JP | 2018087935 A | | 6/2018 | |

OTHER PUBLICATIONS

The State Intellectual Property Office of the People's Republic of China (SIPO) Office Action 1 for for 201910820742.1, dated Jul. 2, 2021 12 Pages (including translation).

M.Tamura et al., "Text-to-audio-visual speech synthesis based on parameter generation from HMM," Sixth European Conference on Speech Communication and Technology, 1999. 4 pages.

P. Edwards et al., "JALI: an Animator-Centric Viseme Model for Expressive Lip Synchronization," ACM Transactions on Graphics (TOG), 2016, 35(4): 127. 11 pages.

S. Taylor et al., "A Deep Learning Approach for Generalized Speech Animation," ACM Transactions on Graphics (TOG), 2017, 36(4): 93. 11 pages.

S. Suwajanakorn et al., "Synthesizing Obama: Learning Lip Sync from Audio," ACM Transactions on Graphics (TOG), 2017, 36(4): 95. 13 pages.

T. Karras et al., "Audio-Driven Facial Animation by Joint End-to-End Learning of Pose and Emotion," ACM Transactions on Graphics (TOG), 2017, 36(4): 94. 12 pages.

D. Povey et al., "The Kaldi Speech Recognition Toolkit," IEEE 2011 workshop on automatic speech recognition and understanding. IEEE Signal Processing Society, 2011 (CONF). 4 pages.

J. S. Garofolo et al., "DARPA TIMIT acoustic-phonetic continuous speech corpus CD-ROM. NIST speech disc 1-1.1," NASA STI/Recon technical report, vol. 93, 1993. 83 pages.

G. Hinton et al., "Deep neural networks for acoustic modeling in speech recognition," IEEE Signal processing magazine, vol. 29, 2012. 16 pages.

L. Sun et al., "Phonetic Posteriorgrams for Many-to-One Voice Conversion Without Parallel Data Training," 2016 IEEE International Conference on Multimedia and Expo (ICME), IEEE, 2016. 6 pages.

J. Shen et al., "Natural TTS Synthesis by Conditioningwavenet on MEL Spectrogram Predictions," arXiv:1712.05884, Feb. 16, 2018. 5 pages.

The Japan Patent Office (JPO) Notification of Reasons for Refusal for Application No. 2021-565810 and Translation Nov. 15, 2022 3 Pages.

Yang Zhou, 5 others, "VisemeNet: Audio-Driven Animator-Centric Speech Animation", [online], 2018, ACM Transactions on Graphics, Association for Computing Machinery, vol. 37, Issue 4, Article 161, p. 1-10.

* cited by examiner

PPG input with a limited
window length

FIG. 9

PPG input with a limited
window length

SPEECH-DRIVEN ANIMATION METHOD AND APPARATUS BASED ON ARTIFICIAL INTELLIGENCE

RELATED APPLICATIONS

This application is a continuation application of PCT Application No. PCT/CN2020/105046, filed on Jul. 28, 2020, which in turn claims priority to Chinese Patent Application No. 201910820742.1, entitled "SPEECH-DRIVEN ANIMATION METHOD AND APPARATUS BASED ON ARTIFICIAL INTELLIGENCE" filed with the China National Intellectual Property Administration on Aug. 29, 2019. The two applications are both incorporated herein by reference in their entirety.

FIELD OF THE TECHNOLOGY

This application relates to the field of data processing, and in particular, to speech-driven animation based on artificial intelligence (AI).

BACKGROUND OF THE DISCLOSURE

Currently, the technology for generating a virtual face animation according to a speech is becoming a research hotspot in the various applications of the industry. For example, for any human speech, an application can drive an animation character to make a mouth shape corresponding to the speech. In this scenario, the existence of the animation character can greatly augment a sense of reality, improve expressiveness, and bring more immersive experience to a user.

In one method, the foregoing technology is implemented by using a Speech2Face system. Generally, to process a human speech, after extracting an acoustic feature such as a Mel frequency cepstral coefficient (MFCC) from the speech, the system may determine, based on the acoustic feature by using a mapping model, an expression parameter of an adjustable animation character, and may control, according to the expression parameter, the animation character to make a mouth shape corresponding to the speech.

However, because the extracted acoustic feature includes information related to the speaker, the mapping model established based on this acoustic feature can accurately determine the corresponding expression parameter for the speech of the specific speaker. If the speaker changes, the expression parameter determined by the mapping model deviates greatly, and consequently the mouth shape of the animation character driven by using this expression parameter is inconsistent with the speech, thereby degrading the interactive experience.

SUMMARY

To resolve the foregoing technical problems, this application provides a speech-driven animation method and apparatus based on artificial intelligence (AI), to effectively support a first speech corresponding to any speaker, thereby improving interactive experience.

The following technical solutions are disclosed in embodiments of this application.

One aspect of the present disclosure provides a speech-driven animation method, performed by an audio and video processing device. The method includes obtaining a first speech, the first speech comprising a plurality of speech frames; determining linguistics information corresponding to a speech frame in the first speech, the linguistics information being used for identifying a distribution possibility that the speech frame in the first speech pertains to phonemes; determining an expression parameter corresponding to the speech frame in the first speech according to the linguistics information; and enabling, according to the expression parameter, an animation character to make an expression corresponding to the first speech.

Another aspect of the present disclosure provides a speech-driven animation apparatus, deployed on an audio and video processing device, the apparatus comprising an obtaining unit, a first determining unit, a second determining unit, and a drive unit: the obtaining unit being configured to obtain a first speech, the first speech comprising a plurality of speech frames; the first determining unit being configured to determine linguistics information corresponding to a speech frame in the first speech, the linguistics information being used for identifying a distribution possibility that the speech frame in the first speech pertains to phonemes; the second determining unit being configured to determine an expression parameter corresponding to the speech frame in the first speech according to the linguistics information; and the drive unit being configured to enable, according to the expression parameter, an animation character to make an expression corresponding to the first speech.

Another aspect of the present disclosure provides a speech-driven animation device, including a processor and a memory, the memory being configured to store program code and transmit the program code to the processor; and the processor being configured to perform the method according to the first aspect according to instructions in the program code.

Another aspect of the present disclosure provides a non-transitory computer-readable storage medium, configured to store program code, the program code being used to perform: obtaining a first speech, the first speech comprising a plurality of speech frames; determining linguistics information corresponding to a speech frame in the first speech, the linguistics information being used for identifying a distribution possibility that the speech frame in the first speech pertains to phonemes; determining an expression parameter corresponding to the speech frame in the first speech according to the linguistics information; and enabling, according to the expression parameter, an animation character to make an expression corresponding to the first speech.

Accordingly, in embodiments of the present disclosure when a first speech including a plurality of speech frames is obtained, linguistics information corresponding to a speech frame in the first speech may be determined, each piece of linguistics information being used for identifying a distribution possibility that a corresponding speech frame pertains to phonemes. That is, the linguistics information reflects a probability distribution that content in the speech frame pertains to the phonemes. Information carried in the linguistics information is unrelated to an actual speaker of the first speech, and therefore the impact of pronunciation habits of different speakers on the subsequent determination of an expression parameter may be counteracted. An animation character may be accurately driven to make an expression, for example, a mouth shape, corresponding to the first speech according to the expression parameter determined according to the linguistics information, thereby effectively processing a first speech corresponding to any speaker, and improving the interactive experience.

BRIEF DESCRIPTION OF THE DRAWINGS

To describe the technical solutions in the embodiments of this application or the related art more clearly, the following briefly describes the accompanying drawings required for describing the embodiments or the related art. Apparently, the accompanying drawings in the following description show merely some embodiments of this application, and persons of ordinary skill in the art may still derive other drawings from the accompanying drawings without creative efforts.

DESCRIPTION OF EMBODIMENTS

The following describes embodiments of this application with reference to the accompanying drawings.

Figure 1:
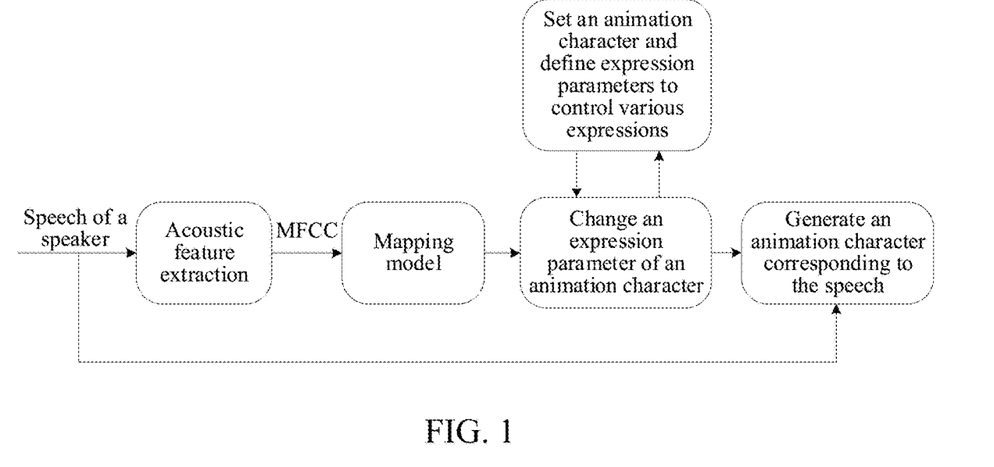
FIG. 1 shows a Speech2Face system in related art.

FIG. 1 illustrates a Speech2Face system used in the related art. To process a speech of a speaker, the system may extract an acoustic feature from the speech to obtain a Mel frequency cepstral coefficient (MFCC). Then, an expression parameter is determined based on the acoustic feature by using a mapping model. For a set animation character whose expression (for example, a mouth shape) may be adjusted by adjusting the expression parameter, the animation character may be adjusted by using the determined expression parameter, to generate an animation character corresponding to the speech.

However, the acoustic feature extracted in the related art is related to the speaker. Therefore, when the speaker changes, the expression parameter determined by the mapping model deviates greatly, and consequently the mouth shape of the animation character driven by using this expression parameter is inconsistent with the speech, thereby degrading the interactive experience.

Therefore, an embodiment of this application provides a speech-driven animation method based on artificial intelligence (AI). In the method, after a first speech including a plurality of speech frames is obtained, linguistics information corresponding to a speech frame in the first speech may be determined. In embodiments of the present application, the first speech may be a speech that needs to be processed by the speech-driven animation system. Compared with the acoustic feature extracted in the related art, for example, the MFCC, information carried in the linguistics information is unrelated to an actual speaker corresponding to the first speech, thereby avoiding the impact of pronunciation habits of different speakers on the subsequent determination of an expression parameter. Therefore, for a first speech corresponding to any speaker, an expression parameter may be determined according to linguistics information, to accurately drive an animation character to make an expression corresponding to the first speech.

The speech-driven animation method provided in the embodiments of this application is implemented based on AI. The AI is a theory, method, technology, and application system that uses a digital computer, or a machine controlled by the digital computer to simulate, extend, and expand human intelligence, perceive an environment, acquire knowledge, and use knowledge to obtain an optimal result. In other words, the AI is a comprehensive technology of computer science, which attempts to understand essence of intelligence and produces a new intelligent machine that can respond in a manner similar to human intelligence. The AI is to study the design principles and implementation methods of various intelligent machines, to enable the machines to have the functions of perception, reasoning, and decision-making.

AI technology is a comprehensive discipline, and relates to a wide range of fields including both hardware-level technologies and software-level technologies. Fundamental AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning (ML)/deep learning (DL).

The embodiments of this application involve AI software technologies include orientations such as the foregoing speech processing technology and ML.

For example, a speech recognition technology in a speech technology may be involved, including speech signal pre-processing, speech signal frequency analyzing, speech signal feature extraction, speech signal feature matching/recognition, speech training, and the like.

For example, the ML may be involved. The ML is a multi-field interdiscipline, and relates to a plurality of disciplines such as a probability theory, statistics, an approximation theory, a convex analysis, and an algorithm complexity theory. The ML specializes in studying how a computer simulates or implements a human learning behavior to obtain new knowledge or skills, and reorganize an existing knowledge structure, to keep improving its performance. The ML is a core of the AI, is a basic way to make the computer intelligent, and is applied to various fields of the AI. The ML generally includes technologies such as DL, and the DL includes artificial neural networks such as a convolutional neural network (CNN), a recurrent neural network (RNN), and a deep neural network (DNN).

The speech-driven animation method based on AI provided in the embodiments of this application is applicable to an audio and video processing device having an animation-driven capability. The audio and video processing device may be a terminal device, or may be a server.

The audio and video processing device may have a capability to implement an automatic speech recognition (ASR) technology and voiceprint recognition in the speech technology. To make the audio and video processing device capable of listening, seeing, and feeling is the future development direction of human-computer interaction, and the speech has become one of the most promising human-computer interaction methods in the future.

In the embodiments of this application, by implementing the foregoing speech technology, the audio and video processing device may recognize an obtained first speech, and implement functions of determining linguistics information corresponding to a speech frame in the first speech, and so on; and the audio and video processing device trains a neural network mapping model through an ML technology, and determines an expression parameter according to the linguistics information by using the neural network mapping model obtained through training, to drive an animation character to make an expression corresponding to the first speech.

If the audio and video processing device is a terminal device, the terminal device may be a smart terminal, a computer, a personal digital assistant (PDA), a tablet computer, or the like.

If the audio and video processing device is a server, the server may be an independent server, or may be a cluster server. When the server implements the speech-driven animation method, the server determines an expression parameter, and drives, by using the expression parameter, the animation character on the terminal device to make an expression corresponding to the first speech.

The speech-driven animation method provided in the embodiments of this application is applicable to various application scenarios in which some human tasks are undertaken, such as a news broadcast, a weather forecast, and a game commentary, and is also applicable to various application scenarios in which some personal services are undertaken, for example, a one-to-one service directed to individuals such as a psychologist or a virtual assistant. In these scenarios, the animation character driven by using the method provided in the embodiments of this application to make the expression greatly augments a sense of reality and improves expressiveness.

For ease of understanding of the technical solutions of this application, the speech-driven animation method provided in the embodiments of this application is described below with reference to an actual application scenario.

Figure 2:
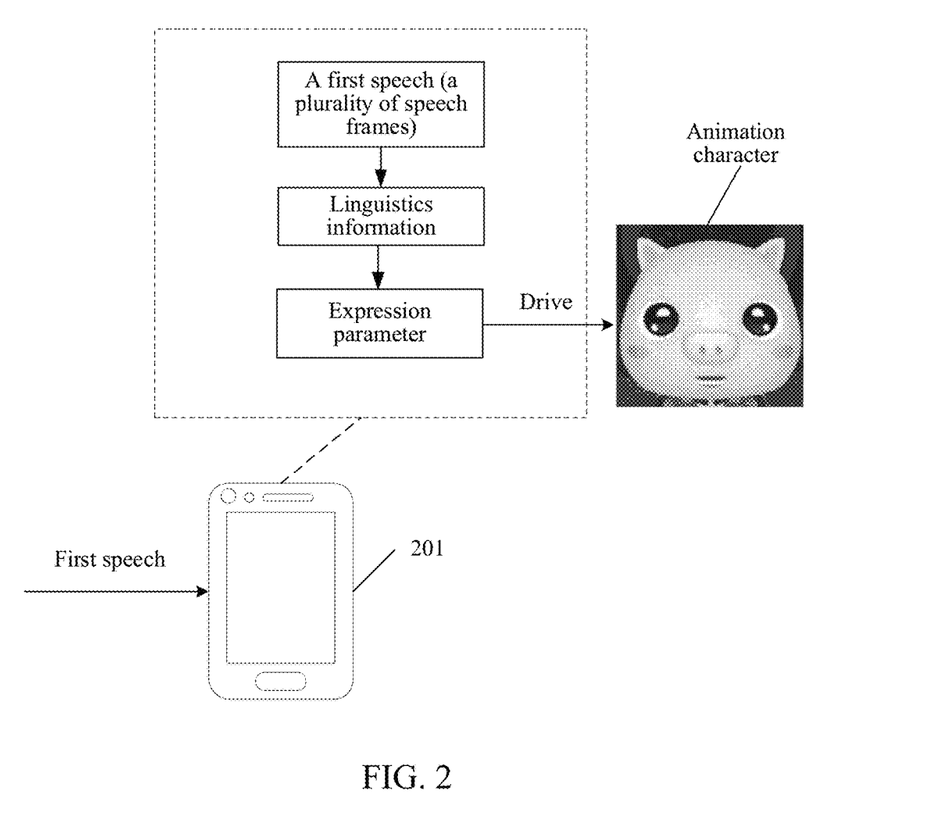
FIG. 2 is an exemplary diagram of an application scenario of a speech-driven animation method according to an embodiment of this application.

FIG. 2 is an exemplary diagram of an application scenario of a speech-driven animation method based on AI according to an embodiment of this application. The application scenario is described by using an example in which an audio and video processing device is a terminal device. The application scenario includes a terminal device 201. The terminal device 201 may obtain a first speech, the first speech including a plurality of speech frames. The first speech is a speech corresponding to any speaker, for example, a speech produced by a speaker. A type of the first speech is not limited in this embodiment. The first speech may be a speech corresponding to saying of the speaker, or may be a speech corresponding to singing of the speaker. A language of the first speech is not limited in this embodiment either. For example, the language of the first speech may be Chinese, English, or the like.

It may be understood that the first speech is not limited to a speech inputted by the speaker through the terminal device 201. In some cases, the first speech to which the method provided in the embodiments of this application is directed may alternatively be a speech generated according to a text. That is, the text is inputted through the terminal device 201, and is converted, through an intelligent speech platform, into a speech that matches a speech feature of the speaker, and the speech is used as the first speech.

Because a phoneme is a minimum phonetic unit obtained through division according to a natural attribute of a speech, analysis is performed according to a pronunciation action in a syllable, and an action (for example, a mouth shape) forms a phoneme. That is, the phoneme is unrelated to the speaker, and corresponding expressions such as mouth shapes have consistency provided that phonemes corresponding to a speech frame in the first speech are the same regardless of who is the speaker, whether the language of the first speech is English or Chinese, and whether texts corresponding to produced phonemes are the same. Based on a feature of the phoneme, in this embodiment, the terminal device 201 may determine linguistics information corresponding to the speech frame in the first speech, the linguistics information being used for identifying a distribution possibility that the speech frame in the first speech pertains to the phonemes, that is, a probability distribution that content in the speech frame pertains to the phonemes, to determine a phoneme to which the content in the speech frame pertains.

It can be learned that, compared with the acoustic feature in the related art involved in the foregoing related content, information carried in the linguistics information is unrelated to an actual speaker of the first speech. The phoneme (the linguistics information) to which the content in the speech frame pertains may be determined regardless of who is the speaker and what is a text corresponding to the content in the speech frame. For example, it is determined that the phoneme to which the content in the speech frame pertains is "a". Although speakers corresponding to the phoneme "a" may be different, and corresponding texts may also be different, expressions, for example, mouth shapes, corresponding to the phoneme "a" are the same provided that the phoneme "a" is produced. Therefore, the terminal device 201 may accurately determine an expression parameter according to the linguistics information, to accurately drive an animation character to make an expression corresponding to the first speech, thereby avoiding the impact of pronunciation habits of different speakers on the determination of the expression parameter, and improving interactive experience.

Next, the speech-driven animation method provided in the embodiments of this application is described in detail with reference to the accompanying drawings.

Figure 3:
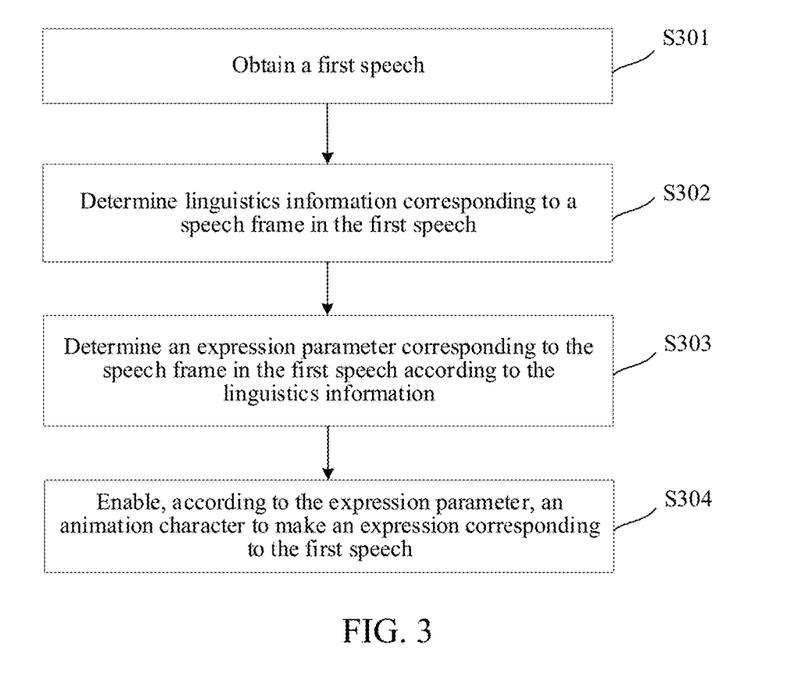
FIG. 3 is a flowchart of a speech-driven animation method according to an embodiment of this application.

FIG. 3 is a flowchart of a speech-driven animation method. The method includes the following steps:

S301. Obtain a first speech.

For example, an audio and video processing device is a terminal device. When a speaker inputs a first speech to the terminal device through a microphone, to intend to drive, according to the first speech, an animation character to make an expression corresponding to the first speech, the terminal device may obtain the first speech. The speaker, a type and language of the first speech, and the like are not limited in this embodiment of this application. This method can support a speech corresponding to any speaker, that is, the speech corresponding to any speaker may be used as the first speech; this method can support various languages, that is, the language of the first speech may be Chinese, English, French, or the like; this method can further support a singing speech, that is, the first speech may be a speech of singing of the speaker.

S302. Determine linguistics information corresponding to a speech frame in the first speech.

The terminal device may extract the linguistics information from the first speech, to determine the linguistics information corresponding to the speech frame in the first speech. The linguistics information is information unrelated to the speaker, and is used for identifying a distribution possibility that the speech frame in the first speech pertains to phonemes. In this embodiment, the Linguistics information may include any one or a combination of two or more of a phonetic posterior gram (PPG), a bottleneck feature, and an embedding feature. The subsequent embodiments are described by using an example in which the linguistics information is the PPG.

Figure 4:
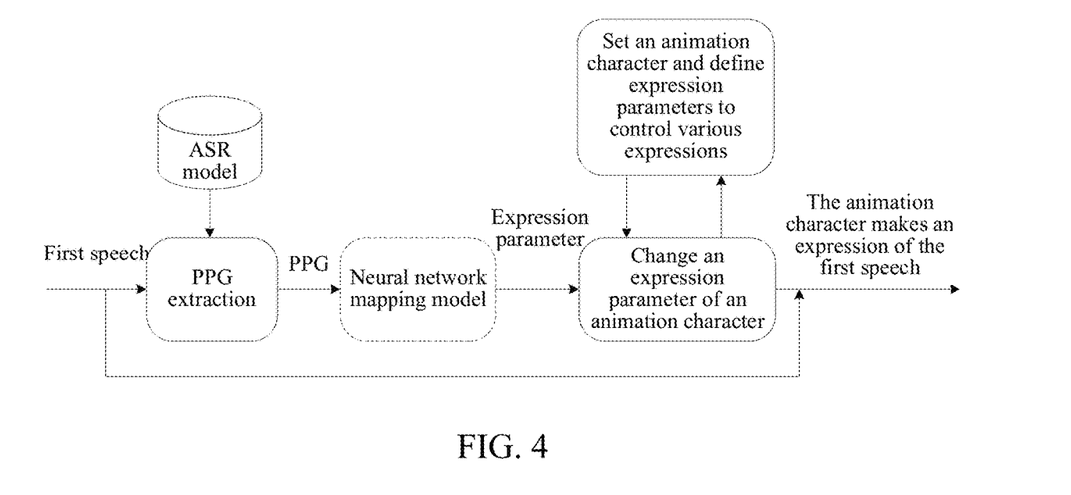
FIG. 4 is an exemplary diagram of an architecture of a Speech2Face system according to an embodiment of this application.

When speech-driven animation is implemented in this embodiment of this application, a system used is also the Speech2Face system, but the Speech2Face system used in this embodiment of this application is different from the Speech2Face system in the related art in the foregoing content. For a system architecture of the Speech2Face system provided in this embodiment of this application, refer to FIG. 4. The Speech2Face system includes four parts. A first part is to train an ASR model for PPG extraction; a second part is to determine a PPG of a first speech based on the trained ASR model (for example, S302); a third part is mapping from an acoustic parameter to an expression parameter, that is, to determine an expression parameter corresponding to the speech frame in the first speech based on the PPG (for example, S303), and FIG. 4 shows an example of determining an expression parameter corresponding to a speech frame in a first speech according to a PPG by using a neural network mapping model; and a fourth part is to drive/enable, according to the expression parameter, a designed 3D animation character to make an expression corresponding to the first speech (for example, S304).

The phonemes involved in this embodiment may include 218 types, including a plurality of languages such as a Chinese phoneme and an English phoneme, to extract linguistics information of the plurality of languages. If the linguistics information is a PPG, an obtained PPG may be a vector having 218 dimensions.

In an implementation, the terminal device may extract the linguistics information by using the ASR model. In this case, an example in which the linguistics information is the PPG is used. To extract the PPG, one ASR model needs to be pre-trained (that is, the foregoing first part). The ASR model may be obtained through training according to training samples that include correspondences between speech segments and phonemes. During actual training, the ASR model is obtained through training with a given ASR data set based on an ASR interface provided by Kaldi. The ASR data set includes the training samples. Kaldi is an open-source speech recognition toolkit. Kaldi predicts, according to an extracted MFCC by using a network structure based on a deep belief network-deep neural network (DBN-DNN), a probability that a speech frame belongs to each phoneme, that is, the PPG, to classify outputted phonemes. For the training process of the ASR model, refer to dotted lines shown in FIG. 5. After the foregoing ASR model is obtained through training, and the first speech passes through the ASR model, a PPG corresponding to the speech frame in the first speech may be outputted and used for the subsequent determination of an expression parameter. The ASR model may actually be a DNN model.

An acoustic feature corresponding to the speech frame in the first speech may be determined by training the ASR model and by determining the linguistics information by using the ASR model. The acoustic feature is the acoustic feature in the related art involved in the foregoing related content, for example, the MFCC. Then, linguistics information corresponding to the acoustic feature is determined by using the ASR model.

Because the ASR data set used for training the ASR model takes speech segments with noise into account, and is more adaptable to the noise, the linguistics information extracted by using the ASR model is more robust than the acoustic feature used in the related art such as the MFCC.

S303. Determine an expression parameter corresponding to the speech frame in the first speech according to the linguistics information.

The expression parameter is used for driving/enabling an animation character to make an expression corresponding to the first speech. That is, an expression parameter of a pre-established animation character is adjusted by using the determined expression parameter, so that the animation character makes the expression that complies with saying of the first speech.

Generally, for the animation character, the expressions may include a facial expression and a body posture expression. The facial expression may include, for example, a mouth shape, a facial action, or a head posture, and the body posture expression may include, for example, a body action, a gesture action, or a walking posture.

In an implementation, the implementation of S303 may be determining the expression parameter corresponding to the speech frame in the first speech according to the linguistics information by using a neural network mapping model, for example, as shown in a dotted box in FIG. 4. The neural network mapping model may be a DNN model, a long short-term memory (LSTM) model, or a bidirectional long short-term memory (BLSTM) model.

The neural network mapping model is obtained through pre-training. The neural network mapping model implements the mapping from the linguistics information to the expression parameter. That is, when the linguistics information is inputted, the expression parameter corresponding to the speech frame in the first speech may be outputted.

Figure 5:
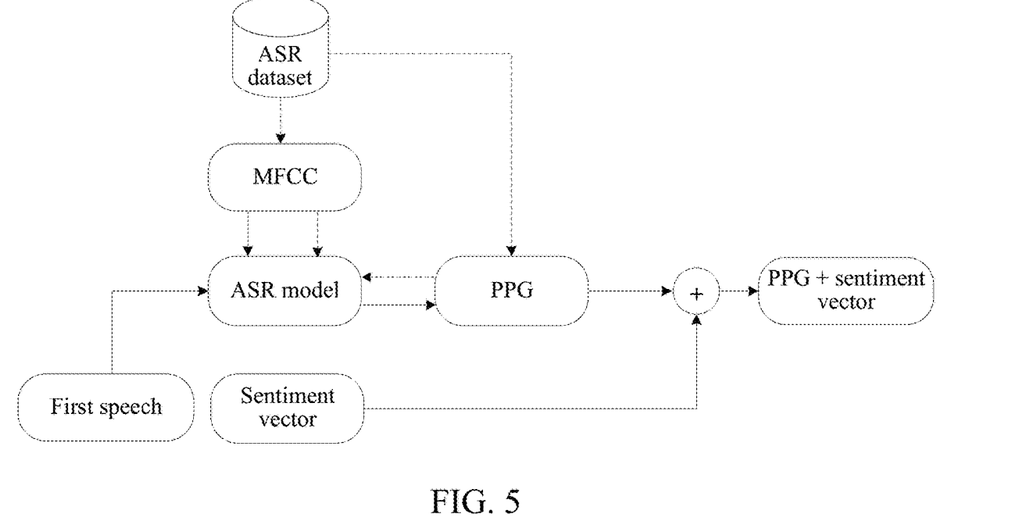
FIG. 5 is an exemplary diagram of a training process of an automatic speech recognition (ASR) model according to an embodiment of this application.

Because the linguistics information is more related to the mouth shape in the expressions, it is more accurate to determine the mouth shape by using the linguistics information. Other expressions than the mouth shape are more related to a sentiment corresponding to the first speech. To accurately determine the expression parameter and drive/enable, by using the expression parameter, the animation character to make a richer expression, for example, drive the animation character to laugh, wink, or the like while making the mouth shape, for one embodiment of S303, refer to FIG. 5 (FIG. 5 shows an example in which linguistics information is a PPG), and after a PPG of the speech frame is obtained by using the trained ASR model, the PPG (that is, the linguistics information) is spliced with a pre-annotated sentiment vector to obtain a final feature, so that the expression parameter corresponding to the speech frame in the first speech is determined according to the PPG and the sentiment vector corresponding to the first speech.

In an aspect of sentiments, four common sentiments are used in this embodiment, including happiness, sadness, anger, and a normal state. The sentiment is represented by using the sentiment vector. The sentiment vector uses a 1-of-K coding mode. That is, a length is set to 4, 1 is taken in each of four dimensions, and 0 is taken in other dimensions, to obtain four vectors used for respectively representing four sentiments. After the PPG of the speech frame is determined, a vector having 218 dimensions is obtained, and is spliced with a 4-dimensional sentiment vector of the first speech to obtain a feature vector having 222 dimensions, which is subsequently used as an input to the neural network mapping model.

The neural network-based neural network mapping model used in this embodiment may be further replaced with a Tacotron decoder. The Tacotron decoder is an attention model used for end-to-end speech synthesis.

S304. Enable, according to the expression parameter, an animation character to make an expression corresponding to the first speech.

For the animation character, the animation character may be a 3D character, or may be a 2D character, which is not limited in this embodiment. For example, an established animation character is shown as the animation character in FIG. 2. This animation character is used to wish everyone a Happy New Year. Assuming that the first speech is "gong xi fa cai, da ji da li", an expression parameter may be determined according to the first speech, to drive the animation character to make an expression (a mouth shape) that may produce "gong xi fa cai, da ji da li". Certainly, the animation character may further make another expression besides the mouth shape.

It can be learned from the foregoing technical solutions that, when a first speech including a plurality of speech frames is obtained, linguistics information corresponding to a speech frame in the first speech may be determined, each piece of linguistics information being used for identifying a distribution possibility that a corresponding speech frame pertains to phonemes. That is, the linguistics information reflects a probability distribution that content in the speech frame pertains to the phonemes. Information carried in the linguistics information is unrelated to an actual speaker of the first speech, and therefore the impact of pronunciation habits of different speakers on the subsequent determination of an expression parameter may be counteracted. An animation character may be accurately driven to make an expression, for example, a mouth shape, corresponding to the first speech according to the expression parameter determined according to the linguistics information, thereby effectively supporting a first speech corresponding to any speaker, and improving the interactive experience.

In one embodiment, the first speech includes a plurality of speech frames. Next, how to determine an expression parameter corresponding to the target speech frame in S303 is described in detail for a target speech frame by using an example in which a speech frame in the first speech is used as the target speech frame.

There is an effect of coarticulation in the speech, and an expression such as a mouth shape corresponding to the target speech frame is related to preceding and succeeding speech frames of the target speech frame in a short time. Therefore, to accurately determine the expression parameter corresponding to the target speech frame, the preceding and succeeding speech frames may be combined when the expression parameter is determined. That is, a speech frame set in which the target speech frame is located is determined. The speech frame set includes the target speech frame and the preceding and succeeding speech frames of the target speech frame, so that the expression parameter corresponding to the target speech frame is determined according to linguistics information corresponding to each speech frame in the speech frame set.

Figure 6:
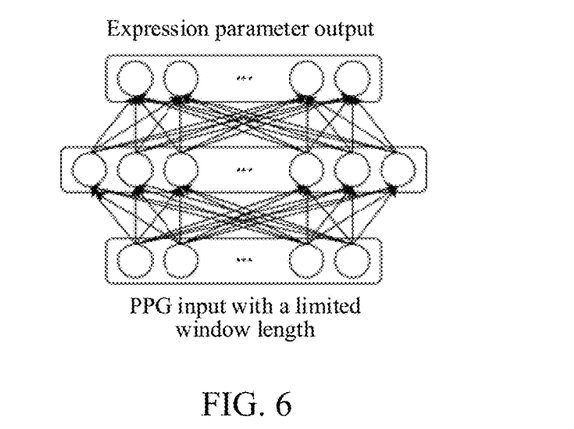
FIG. 6 is an exemplary diagram of determining an expression parameter based on a deep neural network (DNN) model according to an embodiment of this application.

It may be understood that if the expression parameter is determined by using the neural network mapping model, manners of determining the speech frame set are different and quantities of speech frames in the speech frame set are different according to different neural network mapping models used. If the neural network mapping model is the DNN model, that is, a classifier based on a forward connection, as shown in FIG. 6, because an input requirement of the DNN model is a fixed length, a frame-by-frame input is considered for prediction instead of inputting a variable-length sequence for sequence prediction. The expression parameter of the target speech frame needs to be determined with reference to information of the preceding and succeeding speech frames. Therefore, to introduce the preceding and succeeding speech frames, the input is no longer one frame, but an inputted first speech is windowed by using the target speech frame as a center, and speech frames in a window are together used as a short-time sequence input. In this case, the speech frames in the window include the target speech frame and a plurality of speech frames, to form a speech frame set. It can be learned that, by selecting the fixed window length, the input requirement of the DNN model can be naturally met.

In this case, a quantity of speech frames in the speech frame set is determined by the window length, and the window length reflects an input requirement of the neural network mapping model. That is, the quantity of speech frames in the speech frame set is determined according to the neural network mapping model.

FIG. 6 is used as an example. If a PPG is represented by a 218-dimensional vector, and a window length is 7, an input inputted to a DNN model is 7 speech frames including a target speech frame (a PPG input with a limited window length). That is, a quantity of speech frames in a speech frame set is 7. If each speech frame corresponds to one PPG (the 218-dimensional vector in total), the 7 frames correspond to a 218×7-dimensional vector. Each circle in FIG. 6 represents a one-dimensional parameter. When PPGs respectively corresponding to the 7 speech frames are inputted, an expression parameter corresponding to the target speech frame may be outputted.

The DNN model has the advantages of relatively simple modeling, a relatively short training time, and being capable of supporting streaming work, that is, being capable of inputting frame by frame without inputting an entire sequence each time.

Figure 7:
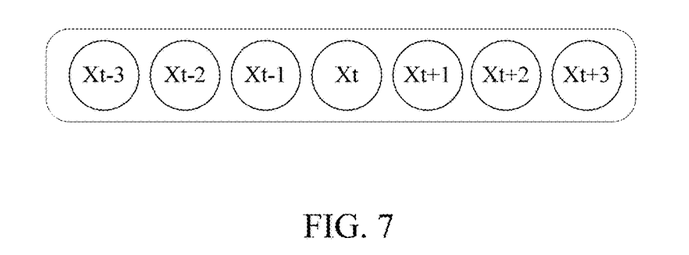
FIG. 7 is an exemplary diagram of consecutive speech frames preceding and succeeding the target speech frame according to an embodiment of this application.

When the neural network mapping model is the DNN model, the plurality of speech frames in the speech frame set may be selected in a plurality of manners in this embodiment. In one embodiment, consecutive speech frames preceding and succeeding the target speech frame are used as preceding and succeeding speech frames of the target speech frame. For example, same quantities of preceding speech frames and following speech frames that are adjacent to the target speech frame are selected by using the target speech frame as the center. Referring to FIG. 7, if a window length is 7, the target speech frame is Xt, and Xt represents a $t^{th}$ speech frame, consecutive speech frames preceding and succeeding Xt include Xt−3, Xt−2, Xt−1, Xt+1, Xt+2, and Xt+3.

Figure 8:
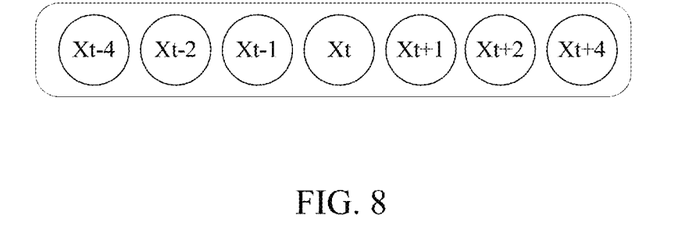
FIG. 8 is an exemplary diagram of inconsecutive speech frames preceding and succeeding the target speech frame according to an embodiment of this application.

In another embodiment, inconsecutive speech frames preceding and succeeding the target speech frame are used as the preceding and succeeding speech frames of the target speech frame. The spacing of the preceding and succeeding speech frames is not limited in this embodiment. For example, the preceding and succeeding speech frames may be multiplicatively selected by using a multiplication frame selection method, that is, in the form of a geometric sequence; or the preceding and succeeding speech frames may be multiplicatively selected in the form of an arithmetic sequence. Referring to FIG. 8, if a window length is 7, a target speech frame is Xt, and preceding and succeeding speech frames are multiplicatively selected in the form of a geometric sequence, the inconsecutive speech frames preceding and succeeding Xt include Xt−4, Xt−2, Xt−1, Xt+1, Xt+2, and Xt+4.

If the neural network mapping model is the LSTM model or the BLSTM model, inputs of the LSTM model and the BLSTM model are similar, a speech frame representing one sentence may be directly inputted to each of the LSTM model and the BLSTM model, and of determining a speech frame representing one sentence may be performing speech segmentation on a first speech. For example, speech segmentation is performed according to a silence segment in the first speech, to obtain a speech segmentation result. Each speech segment obtained through segmentation in the speech segmentation result can represent one sentence, and a PPG of a speech frame included in the speech segment may be used as the input of the LSTM model or the BLSTM model. In this case, speech frames in the speech segment that include the target speech frame in the speech segmentation result may be used as a speech frame set. In this case, a quantity of speech frames in the speech frame set is a quantity of speech frames including the target speech frame in the speech segment obtained through speech segmentation. That is, the quantity of speech frames in the speech frame set is determined according to the speech segmentation result of the first speech.

Figure 9:
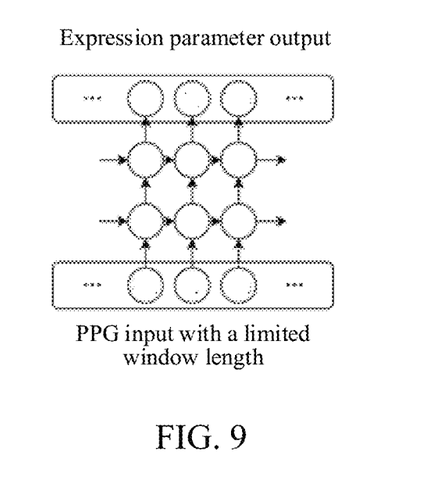
FIG. 9 is an exemplary diagram of determining an expression parameter based on a long short-term memory (LSTM) model according to an embodiment of this application.

For the LSTM model, refer to FIG. 9. Each circle in FIG. 9 represents a one-dimensional parameter. When PPGs respectively corresponding to speech frames in a speech frame set are inputted (that is, a PPG input with a limited window length), an expression parameter corresponding to a target speech frame may be outputted. The advantage of the LSTM model is that sequence modeling may be facilitated, and information of preceding and succeeding speech frames may be captured, but emphasis is placed on information of the preceding speech frames.

Figure 10:
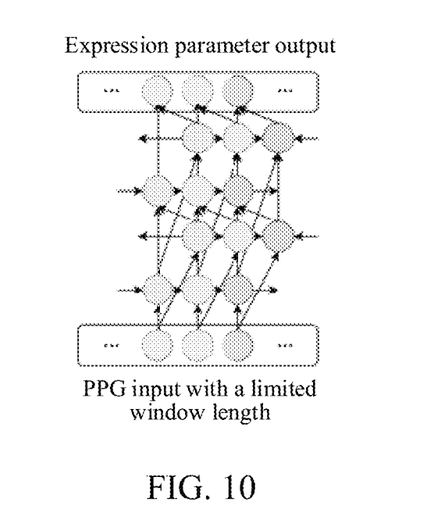
FIG. 10 is an exemplary diagram of determining an expression parameter based on a bidirectional long short-term memory (BLSTM) model according to an embodiment of this application.

For the BLSTM model, refer to FIG. 10. The BLSTM model is similar to the LSTM model, and a difference is that each hidden-layer unit in the BLSTM model can accept input information in two directions of preceding and succeeding speech frames of a sequence. Therefore, compared with the LSTM model, the advantage is that information of the following speech frames may also be better captured, which is more suitable for a situation where all the preceding and succeeding speech frames have a significant impact on the determination of an expression parameter.

It may be understood that when an expression parameter corresponding to a target speech frame is determined according to linguistics information corresponding to each of speech frames in a speech frame set, each target speech frame corresponds to one expression parameter, and mutations or discontinuous connections may exist between expression parameters corresponding to a plurality of target speech frames. Therefore, the determined expression parameters may be smoothed, to avoid the mutations of the expression parameters, so that the continuity of expressions made by an animation character driven according to the expression parameters is stronger, thereby improving the authenticity of the expressions made by the animation character.

The embodiments of this application provide two smoothing processing methods. A first smoothing processing method is mean smoothing.

An undetermined expression parameter corresponding to each speech frame in the speech frame set (that is, an expression parameter of each speech frame in the speech frame set) may be determined according to the linguistics information corresponding to the each speech frame in the speech frame set. The target speech frame may appear in different speech frame sets, to obtain undetermined expression parameters of a plurality of target speech frames. Therefore, an expression parameter of the target speech frame may be smoothed based on undetermined expression parameters of the target speech frame that are respectively determined in different speech frame sets, and an expression parameter corresponding to the target speech frame is calculated.

For example, when the target speech frame is Xt, and the speech frame set is {Xt−2, Xt−1, Xt, Xt+1, Xt+2}, it is determined that undetermined expression parameters respectively corresponding to speech frames in the speech frame set are sequentially {Yt−2, Yt−1, Yt, Yt+1, Yt+2}. The target speech frame Xt may further appear in other speech frame sets such as a speech frame set {Xt−4, Xt−3, Xt−2, Xt−1, Xt}, a speech frame set {Xt−3, Xt−2, Xt−1, Xt, Xt+1}, a speech frame set {Xt−1, Xt, Xt+1, Xt+2, Xt+3}, and a speech frame set {Xt, Xt+1, Xt+2, Xt+3, Xt+4}, and an undetermined expression parameter Yt corresponding to the target speech frame in each of the sets may be determined according to the speech frame sets. That is, a total of 5 undetermined expression parameters of the target speech frame Xt are obtained. The 5 undetermined expression parameters are averaged, so that an expression parameter corresponding to the target speech frame Xt may be calculated.

A second smoothing processing method is a maximum likelihood parameter generation (MLPG) algorithm.

The undetermined expression parameters corresponding to the target speech frame in the speech frame sets (that is, the expression parameter of the target speech frame) may be determined according to the linguistics information corresponding to each speech frame in the speech frame set, and a first-order difference (or second-order difference) of the undetermined expression parameters may be further determined. Therefore, a maximum likelihood sequence is restored with given static parameters (the undetermined expression parameters) and the first-order difference (or second-order difference), and a change of the undetermined expression parameters is corrected by introducing the difference, to achieve a smoothing effect.

After the smoothed expression parameter is obtained, an animation character in a natural state may be driven to make an expression corresponding to the first speech, and the expression made by the animation character is synchronized with the first speech by modifying a parameter setting of the animation character.

Next, the speech-driven animation method provided in the embodiments of this application is described with reference to a specific application scenario.

In this application scenario, the animation character is used for a news broadcast. For example, if a first speech is "guan zhong peng you men, da jia wan shang hao, huan ying shou kan jin tian de xin wen lian bo", the animation character needs to make a mouth shape corresponding to the first speech, so that audiences feel that the first speech is produced by the animation character, thereby augmenting a sense of reality. Therefore, after the first speech "guan zhong peng you men, da jia wan shang hao, huan ying shou kan jin tian de xin wen lian bo" is obtained, linguistics information corresponding to speech frames in the first speech may be determined. For each speech frame, for example, a target speech frame in the first speech, undetermined expression parameters respectively corresponding to speech frames in a speech frame set are determined according to the linguistics information, undetermined expression parameters of the target speech frame that are respectively determined in different speech frame sets are averaged, and an expression parameter corresponding to the target speech frame is calculated. In this way, an expression parameter of each speech frame in the first speech may be obtained, to drive the animation character to make a mouth shape corresponding to "guan zhong peng you men, da jia wan shang hao, huan ying shou kan jin tian de xin wen lian bo".

Figure 11:
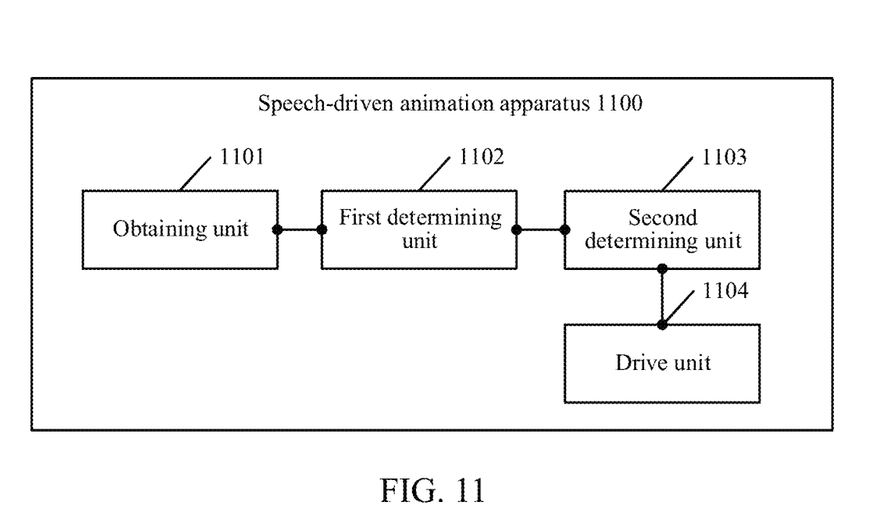
FIG. 11 is a structural diagram of a speech-driven animation apparatus according to an embodiment of this application.

Based on the method provided in the foregoing embodiments, an embodiment further provides a speech-driven animation apparatus 1100 based on AI. The apparatus 1100 is deployed on an audio and video processing device. Referring to FIG. 11, the apparatus 1100 includes an obtaining unit 1101, a first determining unit 1102, a second determining unit 1103, and a drive unit 1104:

the obtaining unit 1101 being configured to obtain a first speech, the first speech including a plurality of speech frames;

the first determining unit 1102 being configured to determine linguistics information corresponding to a speech frame in the first speech, the linguistics information being used for identifying a distribution possibility that the speech frame in the first speech pertains to phonemes;

the second determining unit 1103 being configured to determine an expression parameter corresponding to the speech frame in the first speech according to the linguistics information; and the drive unit 1104 being configured to enable, according to the expression parameter, an animation character to make an expression corresponding to the first speech.

In one embodiment, a target speech frame is a speech frame in the first speech, and for the target speech frame, the second determining unit 1103 is configured to:

determine a speech frame set in which the target speech frame is located, the speech frame set comprising the target speech frame and preceding and succeeding speech frames of the target speech frame; and determine an expression parameter corresponding to the target speech frame according to linguistics information corresponding to each speech frame in the speech frame set.

In one embodiment, a quantity of speech frames in the speech frame set is determined according to a neural network mapping model, or a quantity of speech frames in the speech frame set is determined according to a speech segmentation result of the first speech.

In one embodiment, the consecutive speech frames preceding and succeeding the target speech frame, or the inconsecutive speech frame preceding and succeeding the target speech frame.

In one embodiment, the second determining unit 1103 is configured to:

determine an undetermined expression parameter corresponding to each speech frame in the speech frame set according to the linguistics information corresponding to each speech frame in the speech frame set; and calculate the expression parameter corresponding to the target speech frame according to undetermined expression parameters of the target speech frame that are respectively determined in different speech frame sets.

In one embodiment, the linguistics information includes any one or a combination of two or more of a PPG, a bottleneck feature, and an embedding feature.

In one embodiment, the second determining unit 1103 is configured to:

determine the expression parameter corresponding to the speech frame in the first speech according to the linguistics information by using the neural network mapping model, the neural network mapping model comprising a deep neural network (DNN) model, a long short-term memory (LSTM) model, or a bidirectional long short-term memory (BLSTM) model.

In one embodiment, the second determining unit 1103 is configured to:

determine the expression parameter corresponding to the speech frame in the first speech according to the linguistics information and a sentiment vector corresponding to the first speech.

In one embodiment, the first determining unit 1102 is configured to:

determine an acoustic feature corresponding to the speech frame in the first speech; and determine linguistics information corresponding to the acoustic feature by using an automatic speech recognition (ASR) model.

In one embodiment, the ASR model is obtained through training according to training samples that include correspondences between speech segments and phonemes.

Figure 12:
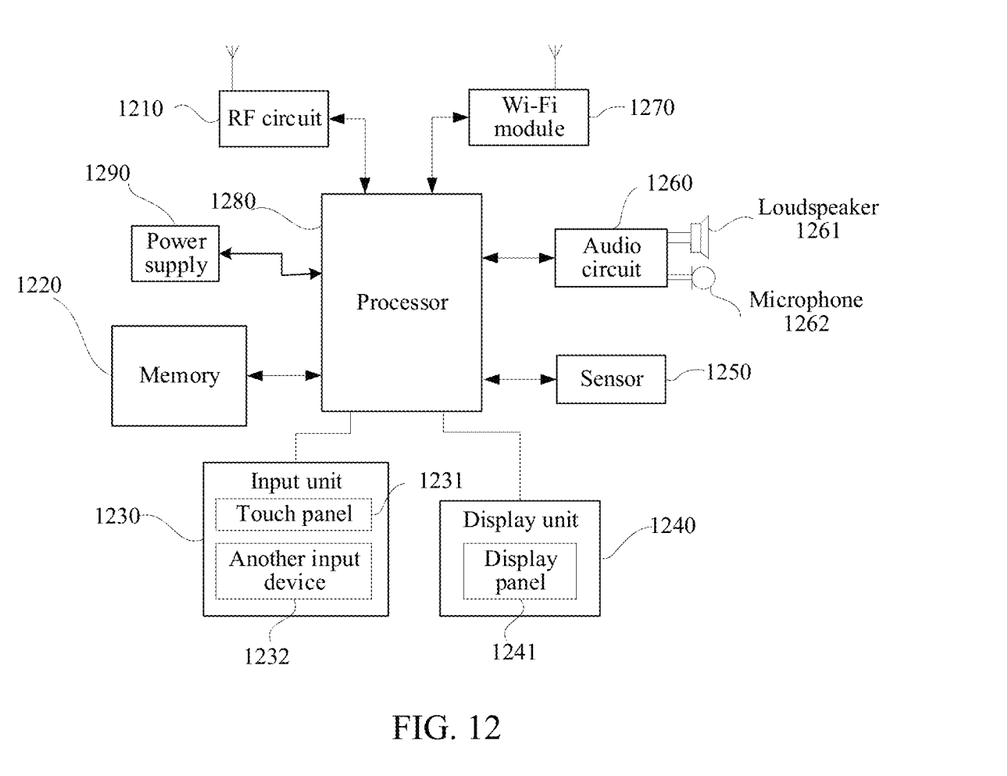
FIG. 12 is a structural diagram of a terminal device according to an embodiment of this application.

An embodiment of this application further provides a speech-driven animation device. The device may drive an animation by using a speech, and the device may be an audio and video processing device. The device is described below with reference to the accompanying drawings. Referring to FIG. 12, an embodiment of this application provides a speech-driven animation device, and the device may be a terminal device. The terminal device may be any smart terminal including a mobile phone, a tablet computer, a PDA, a point of sales (POS), or an on-board computer, and the terminal device being a mobile phone is used as an example.

FIG. 12 is a block diagram of a structure of a part of a mobile phone related to a terminal device according to an embodiment of this application. Referring to FIG. 12, the mobile phone includes components such as a radio frequency (RF) circuit 1210, a memory 1220, an input unit 1230, a display unit 1240, a sensor 1250, an audio circuit 1260, a wireless fidelity (Wi-Fi) module 1270, a processor 1280, and a power supply 1290. Persons skilled in the art may understand that the structure of the mobile phone shown in FIG. 12 does not constitute a limitation on the mobile phone, and the mobile phone may include more or fewer components than those shown in the figure, or some components may be combined, or a different component deployment may be used.

The following describes the components of the mobile phone with reference to FIG. 12 in detail.

The RF circuit 1210 may be configured to send and receive signals during an information receiving and sending process or a call process. Particularly, the RF circuit receives downlink information from a base station, then delivers the downlink information to the processor 1280 for processing, and sends designed uplink data to the base station. Generally, the RF circuit 1210 includes, but not limited to, an antenna, at least one amplifier, a transceiver, a coupler, a low noise amplifier (LNA), and a duplexer. In addition, the RF circuit 1210 may also communicate with a network and another device by means of wireless communication. The wireless communication may use any communication standard or protocol, including, but not limited to a Global System for Mobile communications (GSM), a general packet radio service (GPRS), code division multiple access (CDMA), wideband code division multiple access (WCDMA), Long Term Evolution (LTE), an email, a short messaging service (SMS), and the like.

The memory 1220 may be configured to store a software program and a module. The processor 1280 runs the software program and the module that are stored in the memory 1220, to perform various functional applications and data processing of the mobile phone. The memory 1220 may include a program storage area and a data storage area. The program storage area may store an operating system, an application program required by at least one function (such as a sound playback function and an image display function), and the like. The data storage area may store data (such as audio data and an address book) created according to the use of the mobile phone, and the like. In addition, the memory 1220 may include a high-speed random access memory, and may also include a nonvolatile memory, for example, at least one magnetic disk storage device, a flash memory, or another volatile solid-state storage device.

The input unit 1230 may be configured to receive input digit or character information, and generate a keyboard signal input related to the user setting and function control of the mobile phone. Specifically, the input unit 1230 may include a touch panel 1231 and another input device 1232. The touch panel 1231, which may also be referred to as a touch screen, may collect a touch operation of a user on or near the touch panel (such as an operation of a user on the touch panel 1231 or near the touch panel 1231 by using any suitable object or accessory such as a finger or a stylus), and drive a corresponding connection apparatus according to a preset program. Optionally, the touch panel 1231 may include two parts: a touch detection apparatus and a touch controller. The touch detection apparatus detects a touch orientation of the user, detects a signal generated by the touch operation, and transfers the signal to the touch controller. The touch controller receives the touch information from the touch detection apparatus, converts the touch information into touch point coordinates, and transmits the touch point coordinates to the processor 1280. Moreover, the touch controller may receive and execute a command transmitted from the processor 1280. In addition, the touch panel 1231 may be implemented by using various types, such as a resistive type, a capacitive type, an infrared type, and a surface acoustic wave type. In addition to the touch panel 1231, the input unit 1230 may further include another input device 1232. Specifically, another input device 1232 may include, but not limited to, one or more of a physical keyboard, a functional key (such as a volume control key or a switch key), a track ball, a mouse, and a joystick.

The display unit 1240 may be configured to display information inputted by the user or information provided for the user, and various menus of the mobile phone. The display unit 1240 may include a display panel 1241. Optionally, the display panel 1241 may be configured in the form of a liquid crystal display (LCD), an organic light-emitting diode (OLED), or the like. Further, the touch panel 1231 may cover the display panel 1241. After detecting a touch operation on or near the touch panel, the touch panel 1231 transfers the touch operation to the processor 1280, to determine a type of a touch event. Then, the processor 1280 provides a corresponding visual output on the display panel 1241 according to the type of the touch event. Although in FIG. 12, the touch panel 1231 and the display panel 1241 are used as two separate parts to implement input and output functions of the mobile phone, in some embodiments, the touch panel 1231 and the display panel 1241 may be integrated to implement the input and output functions of the mobile phone.

The mobile phone may further include at least one sensor 1250 such as an optical sensor, a motion sensor, and other sensors. Specifically, the optical sensor may include an ambient light sensor and a proximity sensor. The ambient light sensor may adjust luminance of the display panel 1241 according to brightness of the ambient light. The proximity sensor may switch off the display panel 1241 and/or backlight when the mobile phone is moved to the ear. As one type of motion sensor, an acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone, are not further described herein.

The audio circuit 1260, a loudspeaker 1261, and a microphone 1262 may provide audio interfaces between the user and the mobile phone. The audio circuit 1260 may convert received audio data into an electric signal and transmit the electric signal to the loudspeaker 1261. The loudspeaker 1261 converts the electric signal into a sound signal for output. On the other hand, the microphone 1262 converts a collected sound signal into an electric signal. The audio circuit 1260 receives the electric signal and converts the electric signal into audio data, and outputs the audio data to the processor 1280 for processing. Then, the processor sends the audio data to, for example, another mobile phone by using the RF circuit 1210, or outputs the audio data to the memory 1220 for further processing.

Wi-Fi is a short distance wireless transmission technology. The mobile phone may enable, by using the Wi-Fi module 1270, a user to receive and transmit an email, browse a web page, access stream media, and the like. This provides wireless broadband Internet access for the user. Although FIG. 12 shows the Wi-Fi module 1270, it may be understood that the Wi-Fi module is not a necessary component of the mobile phone, and the Wi-Fi module may be omitted as required provided that the scope of the essence of the present disclosure is not changed.

The processor 1280 is the control center of the mobile phone, and is connected to various parts of the mobile phone by using various interfaces and lines. By running or executing the software program and/or module stored in the memory 1220, and invoking data stored in the memory 1220, the processor performs various functions and data processing of the mobile phone, thereby performing overall monitoring on the mobile phone. Optionally, the processor 1280 may include one or more processing units. Preferably, the processor 1280 may integrate an application processor and a modem. The application processor processes an operating system, a user interface, an application program, and the like. The modem processes wireless communication. It may be understood that the modem may not be integrated into the processor 1280 either.

The mobile phone further includes the power supply 1290 (such as a battery) for supplying power to the components. Preferably, the power supply may be logically connected to the processor 1280 by using a power management system, thereby implementing functions such as charging, discharging, and power consumption management by using the power management system.

Although not shown in the figure, the mobile phone may further include a camera, a Bluetooth module, and the like. Details are not described herein again.

In this embodiment, the processor 1280 included in the terminal further has the following functions:

obtaining a first speech, the first speech comprising a plurality of speech frames;

determining linguistics information corresponding to a speech frame in the first speech, the linguistics information being used for identifying a distribution possibility that the speech frame in the first speech pertains to phonemes;

determining an expression parameter corresponding to the speech frame in the first speech according to the linguistics information; and enabling, according to the expression parameter, an animation character to make an expression corresponding to the first speech.

Figure 13:
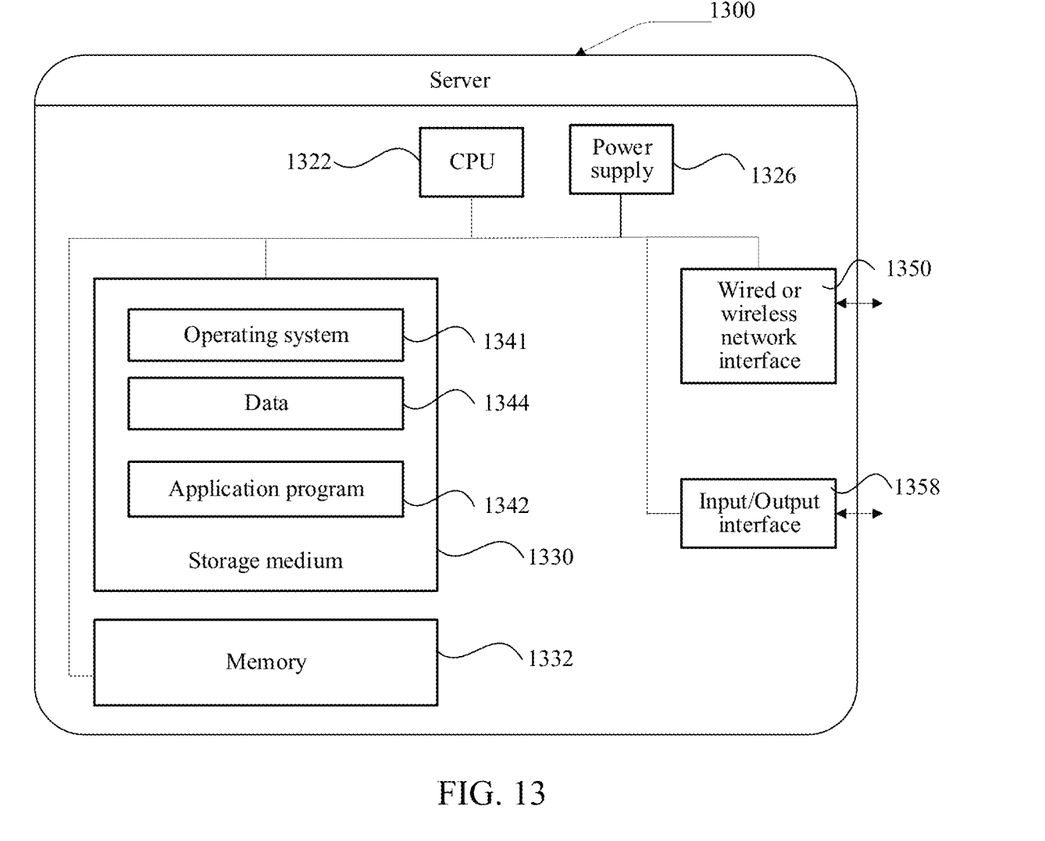
FIG. 13 is a structural diagram of a server according to an embodiment of this application.

An embodiment of this application further provides a server. FIG. 13 is a structural diagram of a server 1300 according to an embodiment of this application. The server 1300 may vary greatly due to different configurations or performance, and may include one or more central processing units (CPUs) 1322 (for example, one or more processors) and a memory 1332, and one or more storage media 1330 (for example, one or more mass storage devices) that store application programs 1342 or data 1344. The memory 1332 and the storage medium 1330 may implement transient storage or permanent storage. A program stored in the storage medium 1330 may include one or more modules (not shown in the figure), and each module may include a series of instruction operations on the server. Furthermore, the CPU 1322 may be configured to communicate with the storage medium 1330, and perform, on the server 1300, the series of instruction operations in the storage medium 1330.

The server 1300 may further include one or more power supplies 1326, one or more wired or wireless network interfaces 1350, one or more input/output interfaces 1358, and/or one or more operating systems 1341 such as Windows Server™, Mac OS X™, Unix™, Linux, and FreeBSD™.

The steps performed by the server in the foregoing embodiments may be based on the server structure shown in FIG. 13.

An embodiment of this application further provides a computer-readable storage medium, configured to store program code, the program code being used for performing the speech-driven animation method according to the foregoing embodiments.

An embodiment of this application further provides a computer program product including instructions, the instructions, when being run on a computer, causing the computer to perform the speech-driven animation method according to the foregoing embodiments.

In the specification and the accompanying drawings of this application, the terms "first", "second", "third", "fourth", and the like (if existing) are intended to distinguish between similar objects rather than describe a specific sequence or a precedence order. Data used in this way may be interchanged in an appropriate case, so that the embodiments of this application described herein can be implemented in a sequence other than the sequence illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

In this application, "at least one" refers to one or more, and "a plurality of" refers to two or more. The term "and/or" is used for describing an association between associated objects and representing that three associations may exist. For example, "A and/or B" may indicate that only A exists, only B exists, and both A and B exist, where A and B may be singular or plural. The character "/" generally indicates an "or" relationship between the associated objects. "At least one of the following" or a similar expression thereof refers to any combination of these items, including one item or any combination of a plurality of items. For example, at least one of a, b, or c may represent a, b, c, "a and b", "a and c", "b and c", or "a, b, and c", where a, b, and c may be singular or plural.

In the embodiments provided in this application, the disclosed system, apparatus, and method may be implemented in other manners. For example, the described apparatus embodiment is merely exemplary. For example, a unit or a module division is merely a logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electric, mechanical, or other forms.

The units or modules described as separate parts may or may not be physically separate, and components displayed as units may or may not be physical units, that is, may be located in one position, or may be distributed on a plurality of network units. Some or all of the units may be selected according to actual requirements to achieve the objectives of the solutions in the embodiments.

In addition, functional units in the embodiments of this application may be integrated into one processing unit, or each of the units may exist alone physically, or two or more units are integrated into one unit. The integrated unit may be implemented in the form of hardware, or may be implemented in the form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the related technology, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store a computer program, such as a USB flash drive, a removable hard disk, a read-only memory (ROM), a random access memory (RAM), a magnetic disk, or an optical disk.

The foregoing embodiments are merely intended for describing the technical solutions of this application, but not for limiting this application. Although this application is described in detail with reference to the foregoing embodiments, persons of ordinary skill in the art understand that they may still make modifications to the technical solutions described in the foregoing embodiments or make equivalent replacements to some technical features thereof, without departing from the spirit and scope of the technical solutions of the embodiments of this application.

What is claimed is:

1. A speech-driven animation method, performed by an audio and video processing device, the method comprising:
   obtaining a first speech with an acoustic feature, the first speech comprising a plurality of speech frames;
   determining linguistics information corresponding to a speech frame in the first speech by applying a neural network mapping model to extract the acoustic feature, the linguistics information being used for identifying a distribution possibility that the speech frame in the first speech pertains to phonemes;
   determining an expression parameter corresponding to the speech frame in the first speech according to the linguistics information, wherein the expression parameters do not reflect pronunciation habits of different speakers; and
   enabling, according to the expression parameter, an animation character to make an expression corresponding to the first speech.

2. The method according to claim 1, wherein a target speech frame is a speech frame in the first speech, and the determining an expression parameter corresponding to the speech frame in the first speech according to the linguistics information comprises:
   determining a speech frame set in which the target speech frame is located, the speech frame set comprising the target speech frame and speech frames preceding and succeeding the target speech frame; and
   determining an expression parameter corresponding to the target speech frame according to linguistics information corresponding to each speech frame in the speech frame set.

3. The method according to claim 2, wherein a quantity of speech frames in the speech frame set is determined according to a neural network mapping model, or a quantity of speech frames in the speech frame set is determined according to a speech segmentation result of the first speech.

4. The method according to claim 2, wherein the speech frames preceding and succeeding the target speech frame are consecutive preceding and succeeding speech frames, or the speech frames preceding and succeeding the target speech frame are inconsecutive speech frames.

5. The method according to claim 2, wherein the determining an expression parameter corresponding to the target speech frame according to linguistics information corresponding to each speech frame in the speech frame set comprises:
   determining an undetermined expression parameter corresponding to each speech frame in the speech frame set according to the linguistics information corresponding to each speech frame in the speech frame set; and
   calculating the expression parameter corresponding to the target speech frame according to undetermined expression parameters of the target speech frame that are respectively determined in different speech frame sets.

6. The method according to claim 1, wherein the linguistics information comprises any one or a combination of two or more of a phonetic posterior gram (PPG), a bottleneck feature, and an embedding feature.

7. The method according to claim 1, wherein the determining an expression parameter corresponding to the speech frame in the first speech according to the linguistics information comprises:
   determining the expression parameter corresponding to the speech frame in the first speech according to the linguistics information by using the neural network mapping model, the neural network mapping model comprising a deep neural network (DNN) model, a long short-term memory (LSTM) model, or a bidirectional long short-term memory (BLSTM) model.

8. The method according to claim 1, wherein the determining an expression parameter corresponding to the speech frame in the first speech according to the linguistics information comprises:
   determining the expression parameter corresponding to the speech frame in the first speech according to the linguistics information and a sentiment vector corresponding to the first speech.

9. The method according to claim 1, wherein the determining linguistics information corresponding to a speech frame in the first speech comprises:
   determining an acoustic feature corresponding to the speech frame in the first speech; and
   determining linguistics information corresponding to the acoustic feature by using an automatic speech recognition (ASR) model.

10. The method according to claim 9, wherein the ASR model is obtained through training according to training samples that comprise correspondences between speech segments and phonemes.

11. A speech-driven animation apparatus, deployed on an audio and video processing device, the apparatus comprising a processor and a memory, the memory being configured to store program code and transmit the program code to the processor; and when executing the program code, the processor being configured to:
   obtain a first speech with an acoustic feature, the first speech comprising a plurality of speech frames;
   determine linguistics information corresponding to a speech frame in the first speech by applying a neural network mapping model to extract the acoustic feature, the linguistics information being used for identifying a distribution possibility that the speech frame in the first speech pertains to phonemes;
   determine an expression parameter corresponding to the speech frame in the first speech according to the linguistics information, wherein the expression parameters do not reflect pronunciation habits of different speakers; and
   enable according to the expression parameter, an animation character to make an expression corresponding to the first speech.

12. The apparatus according to claim 11, wherein a target speech frame is a speech frame in the first speech, and for the target speech frame, the processor is further configured to:
   determine a speech frame set in which the target speech frame is located, the speech frame set comprising the target speech frame and preceding and succeeding speech frames of the target speech frame; and
   determine an expression parameter corresponding to the target speech frame according to linguistics information corresponding to each speech frame in the speech frame set.

13. The method according to claim 1, wherein the expression includes a mouth shape, a facial action, or a head posture.

14. A non-transitory computer-readable storage medium, configured to store program code, the program code, when being executed by a processor, causing the processor to perform:
- obtaining a first speech with an acoustic feature, the first speech comprising a plurality of speech frames;
- determining linguistics information corresponding to a speech frame in the first speech by applying a neural network mapping model to extract the acoustic feature, the linguistics information being used for identifying a distribution possibility that the speech frame in the first speech pertains to phonemes;
- determining an expression parameter corresponding to the speech frame in the first speech according to the linguistics information, wherein the expression parameters do not reflect pronunciation habits of different speakers; and
- enabling, according to the expression parameter, an animation character to make an expression corresponding to the first speech.

15. The computer-readable storage medium according to claim 14, wherein a target speech frame is a speech frame in the first speech, and the determining an expression parameter corresponding to the speech frame in the first speech according to the linguistics information comprises:
- determining a speech frame set in which the target speech frame is located, the speech frame set comprising the target speech frame and the speech frames preceding and succeeding the target speech frame; and
- determining an expression parameter corresponding to the target speech frame according to linguistics information corresponding to each speech frame in the speech frame set.

16. The computer-readable storage medium according to claim 15, wherein the speech frames preceding and succeeding the target speech frame are consecutive preceding and succeeding speech frames, or the speech frames preceding and succeeding the target speech frame are inconsecutive speech frames.

17. The computer-readable storage medium according to claim 15, wherein the determining an expression parameter corresponding to the target speech frame according to linguistics information corresponding to each speech frame in the speech frame set comprises:
- determining an undetermined expression parameter corresponding to each speech frame in the speech frame set according to the linguistics information corresponding to each speech frame in the speech frame set; and
- calculating the expression parameter corresponding to the target speech frame according to undetermined expression parameters of the target speech frame that are respectively determined in different speech frame sets.

18. The computer-readable storage medium according to claim 14, wherein the linguistics information comprises any one or a combination of two or more of a phonetic posterior gram (PPG), a bottleneck feature, and an embedding feature.

19. The computer-readable storage medium according to claim 14, wherein the determining an expression parameter corresponding to the speech frame in the first speech according to the linguistics information comprises:
- determining the expression parameter corresponding to the speech frame in the first speech according to the linguistics information by using the neural network mapping model, the neural network mapping model comprising a deep neural network (DNN) model, a long short-term memory (LSTM) model, or a bidirectional long short-term memory (BLSTM) model.

* * * * *